(12) United States Patent
Martaeng

(10) Patent No.: US 9,160,192 B2
(45) Date of Patent: Oct. 13, 2015

(54) CHARGING CIRCUIT WITH INDUCTANCE-BASED CURRENT LIMITING AND METHOD FOR OPERATING SUCH CIRCUIT

(75) Inventor: Jesper Martaeng, Lerum (SE)

(73) Assignee: V2 Plug-In Hybrid Vehicle Partnership Handelsbolag, Gothenburg (SE)

( * ) Notice: Subject to any disclaimer, the term of this patent is extended or adjusted under 35 U.S.C. 154(b) by 501 days.

(21) Appl. No.: 13/610,185

(22) Filed: Sep. 11, 2012

(65) Prior Publication Data

US 2013/0063087 A1 Mar. 14, 2013

(30) Foreign Application Priority Data

Sep. 14, 2011 (EP) ..................... 11181239

(51) Int. Cl.
*H02J 7/00* (2006.01)
(52) U.S. Cl.
CPC ............. *H02J 7/0065* (2013.01); *H02J 7/0021* (2013.01); *H02J 2007/0049* (2013.01)
(58) Field of Classification Search
CPC H02J 7/0065; H02J 7/0021; H02J 2007/0049
See application file for complete search history.

(56) References Cited

U.S. PATENT DOCUMENTS 5,998,977 A * 12/1999 Hsu et al. ..................... 323/272
6,128,323 A * 10/2000 Myers et al. ................. 372/38.1
6,208,896 B1   3/2001 Mulhauser
7,893,666 B2 *  2/2011 Sievers et al. ................ 323/222
2003/0117111 A1 *  6/2003 Bedini ........................... 320/135
2006/0071639 A1   4/2006 Ross et al.
2010/0109617 A1   5/2010 Erdl

FOREIGN PATENT DOCUMENTS

DE          102004057690        6/2006
WO              9961965        12/1999

OTHER PUBLICATIONS

International Search Report and Written Opinion from corresponding EP Application No. EP11181239.2, dated Feb. 29, 2012.

* cited by examiner

*Primary Examiner* — Naum B Levin
(74) *Attorney, Agent, or Firm* — Renner, Otto, Boisselle, Sklar, LLP

(57) ABSTRACT

A charging circuit includes first and second input terminals connecting the circuit to first and second supply terminals, respectively, of a DC power source, first and second output terminals providing an output voltage to a load to be charged, a first switch between the first and second input terminals, a current sensor between the first input terminal and the first output terminal in series with the first switch, a connecting element having first and second inductance connectors for connecting an inductance, the first inductance connector connected to the switch and the second inductance connector connected to the first output terminal, and a diode element connected to the first inductance connector and the second output terminal. The first switch and the current sensor are arranged to be connected to a control circuit arranged for controlling operation of the first switch in response to a signal received from the current sensor.

13 Claims, 2 Drawing Sheets

CHARGING CIRCUIT WITH INDUCTANCE-BASED CURRENT LIMITING AND METHOD FOR OPERATING SUCH CIRCUIT

TECHNICAL FIELD

The invention relates to the field of power electronics and in particular to the field of charging a load.

BACKGROUND OF THE INVENTION

Various loads to be powered by an electrical power supply comprise capacitances. These capacitances may be either parasitic or intended capacitances. At the moment such load is connected to a power supply, this can result in high currents, in particular if the power supply has a low internal resistance. This may for example be the case with a battery. A possible solution for this is by switched charging. A battery is connected to a load comprising a certain capacitance via a relay and a resistor. These components are expensive and bulky. Furthermore they need to be matched to the system load in order to fulfil required pre-charge time. This makes the circuit sensitive to variations (ex. age and temperature) or changes and modifications to the system. Furthermore only a limited number of pre-charge attempts can be made in a limited time frame before the resistor will overheat.

SUMMARY OF THE INVENTION

It is preferred to have a more efficient circuit available.

The invention provides in a first aspect a Charging circuit comprising: a first input terminal and a second input terminal for connecting the circuit to a first supply terminal and a second supply terminal, respectively, of a DC power source; a first output terminal and a second output terminal for providing an output voltage to a load to be charged; a first switch arranged between the first input terminal and the first output terminal; a current sensor arranged between the first input terminal and the first output terminal in series with the first switch; a connecting element comprising a first inductance connector and a second inductance connector for connecting an inductance, the first inductance connector connected to the switch and the second connector connected to the second output terminal; a diode element connected to the first inductance connector and the second output terminal such that when the first switch is switched on, current flowing through the switch is prevent from flowing from the switch to the second output terminal via the diode element; the first switch and the current sensor being arranged to be connected to a control circuit arranged for controlling operation of the switch in response to a signal received from the current sensor.

By enabling the use of an inductance rather than a resistor for limiting the current in the circuit, the current is limited in a way that electrical energy is preserved in the circuit, rather than dissipated. The diode element is provided to enable energy stored in the inductance to flow to the load when the switch is switched off. Furthermore, by operating the switch in relation to the current sensed, the switch can be operated to enable optimally efficient operation of the circuit.

In an embodiment of the circuit according to the invention, the charging circuit comprises the control circuit, and the control circuit is arranged to: upon receiving an activation signal, switch on the first switch; upon receiving a signal from the current sensor indicating that the current sensed by the current sensor is at or above a first pre-determined current level, switch off the first switch; after a first pre-determined amount of time after the first switch has been switched off, switch on the first switch.

In this way, the current can be kept at or below a pre-determined current level. This means on one hand that the load can be charged as fast as possible and on the other hand that the current is kept at or below a maximum level allowed for for example the switch or other circuit components.

In a further embodiment of the circuit according to the invention, the control circuit is arranged to repeat a) through c) until the signal received from the current sensor indicates that the current sensed by the current sensor indicates that when the first switch is switched on, the current does not reach a second pre-determined current level within a second pre-determined amount of time.

When the load is charged, the voltage over it is substantially the same as that over the power source. So when both are connected directly, over an inherent resistance of a conductive line, no large currents are expected anymore, making the switched charging obsolete at that moment.

In another embodiment of the circuit according to the invention, the control circuit is arranged to be coupled to a voltage sensor for sensing the voltage over the load and wherein the control circuit is arranged to repeat a) through c) until a signal received from the voltage sensor indicates that the voltage over the load has reached a pre-determined voltage level.

This allows to detect a charged state of the load in another way.

In yet a further embodiment of the circuit according to the invention, the first pre-determined amount of time is substantially equal to a measured amount of time that the first switch is switched on until the pre-determined current level is detected.

As the load is charged, the voltage over it will rise. Hence, the difference between the voltage of the power source and the voltage over the load will decrease. This means that the characteristics of the charging current will change and in particular that the rate with which the current level rises will change. So the time required to reach the pre-determined current level is reached reduces. Also the rate with which the voltage over the inductance drops reduces over time. By making the switching frequency dependent on the time with which the pre-determined current level is reached, efficiency of the circuit is increased.

In yet another embodiment of the circuit according to the invention, the first pre-determined amount of time is substantially equal to the difference between a third pre-determined amount of time and a measured amount of time that the first switch is switched on until the pre-determined current level is detected.

In this embodiment, the switching frequency is constant, with a variable duty cycle. Such circuit is simpler and hence cheaper to implement, as no storage of time periods is required.

Again a further embodiment of the circuit according to the invention comprises a second switch for connecting the first input terminal to the first output terminal such that the first switch and the connecting element are bypassed.

At the moment the load is charged, it is preferred to have switch, current sensor and inductance bypassed to prevent loss of energy due to dissipation by these components and to reduce wear of these components.

The invention provides in a second aspect an electrically powered vehicle comprising a charging circuit according to any of the claims 1 to 12.

The invention provides in a third aspect a method of charging a load via a circuit comprising a first output terminal and a second output terminal by providing a supply voltage via the circuit through a first input terminal and a second input terminal comprised by the circuit, the method comprising: providing the supply voltage to the load via a switch and an inductance disposed between the first input terminal and the first output terminal; sensing the current through the switch; upon the sensed current reaching a pre-determined current value, switch off the switch; enabling electrical energy stored in the inductance to be provided to the load via a diode element disposed between the inductance and the second output terminal.

BRIEF DESCRIPTION OF DRAWINGS

The invention and embodiments thereof will now be described in conjunction with figures. These figures are provided for illustrative purposes rather than for limiting the scope of the invention.

DESCRIPTION OF EXAMPLE EMBODIMENTS OF THE INVENTION

Figure 1:
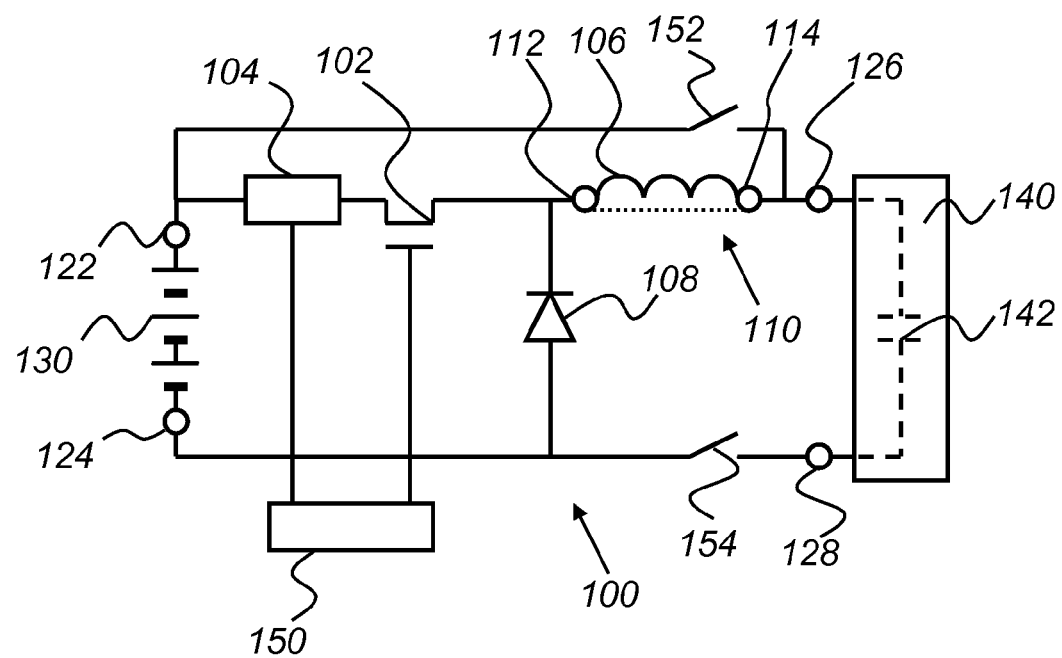
FIG. 1 shows an embodiment of the circuit according to the invention.

FIG. 1 discloses a circuit 100 as an embodiment of the charging circuit according to the invention. The circuit 100 comprises a MOSFET 102 as a first switch, a current sensor 104, connected in series with the MOSFET 102 for sensing the current through the MOSFET 102, an inductor connecting element 110 comprising a first inductor connector 112 connected to the MOSFET 102 and a second inductor connector 114. An inductor 106 as an inductive element is connected in series with the MOSFET 102 and the current sensor 104 via the inductor connecting element 110.

The circuit 100 further comprises a first input terminal 122 and a second input terminal 124 that are both arranged to connect the circuit 100 to a battery 130 as a DC power source. A person skilled in the art will appreciate that also other DC power sources may be connected to the circuit 100, like a rectifier circuit connected to an AC power source. The circuit 100 also comprises a first output terminal 126 and a second output terminal 128 for connecting the circuit 100 to the load 140. In particular in this embodiment, the load 140 comprises a capacitance 142. The capacitance 142 may be an actual capacitor, a parasitic capacitance or a combination thereof.

The circuit 100 also comprises a diode 108 as a diode element connected to the first inductor connector 112 at the cathode and to the second output terminal at the anode. It is noted that also other single rectifying elements having substantially the same functionality as a semiconductor junction diode may be used.

In this embodiment, the anode of the diode 108 is connected to the second output terminal 128 via a second switch 154. In inactive state of the circuit 100, the second switch 154 is preferably set to a non-conductive state. A third switch 152 is provided to directly connect the first input terminal 122 to the first output terminal 126.

A control circuit 150 is connected to the current sensor 104 and the MOSFET 102 for controlling the operation of the MOSFET 102 in response to the current level sensed by the current sensor 104. In this embodiment, the current sensor 104 is connected to the control circuit 150 via a single signalling wire. In another embodiment, the current sensor 104 is embodied as a resistor having a relatively low value (in the order of a few Ohms or less) over which the control circuit 150 senses the voltage.

Figure 2:
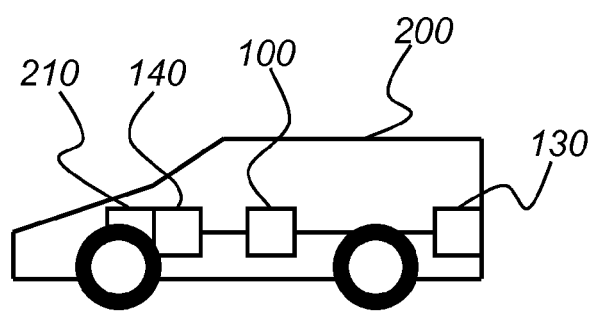
FIG. 2 shows an embodiment of the electrically powered vehicle according to the invention.

FIG. 2 shows a car 200 as a vehicle comprising the battery 130, the circuit 100 with the inductor 106 and the control circuit 150 connected thereto (the latter two not shown for the reason of clarity), the load 140 and an electromotor 210. In this embodiment, the load 140 is a driver for the electromotor 210. Such drivers usually comprise filter capacitances as part of inverters, charge pumps, DC/AC or DC/DC converters and other sub-circuits and elements. Additionally or alternatively, other loads may comprise parasitic capacitances.

The battery 130 is connected to the electromotor 210 via the circuit 100 and the load for powering the electromotor 210. The electromotor 210 is in turn connected to the drive train of the car 200. Alternatively, the car 200 comprises multiple electro motors; for example one for driving the front wheels and one for driving the rear wheels or one electromotor for each wheel. The car 200 may be a fully electric vehicle, a general hybrid vehicle or a plug-in hybrid vehicle. A hybrid vehicle in this context is a vehicle that comprises an electromotor and a combustion engine for driving the vehicle, where energy generated by the combustion engine may also be used for charging a battery and/or directly driving the electromotor.

Figure 3:
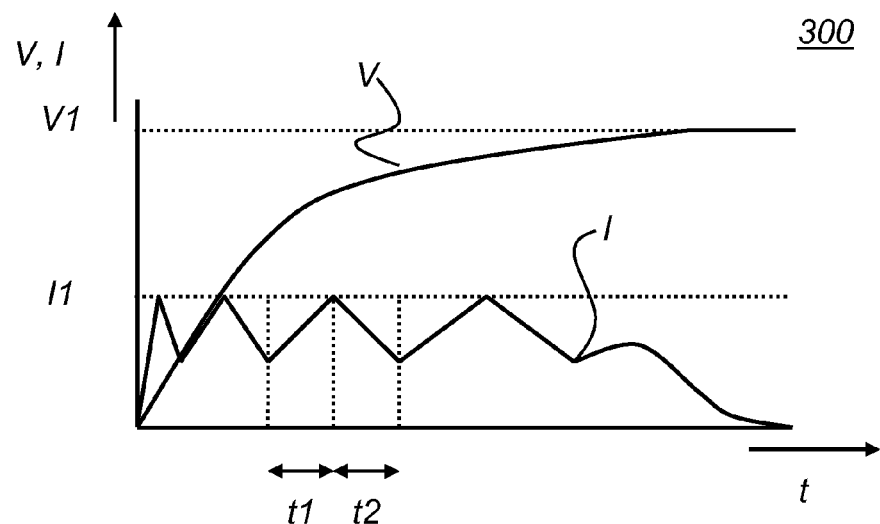
FIG. 3 shows a first graph depicting voltage and current characteristics versus time of another embodiment of the circuit according to the invention.
Figure 4:
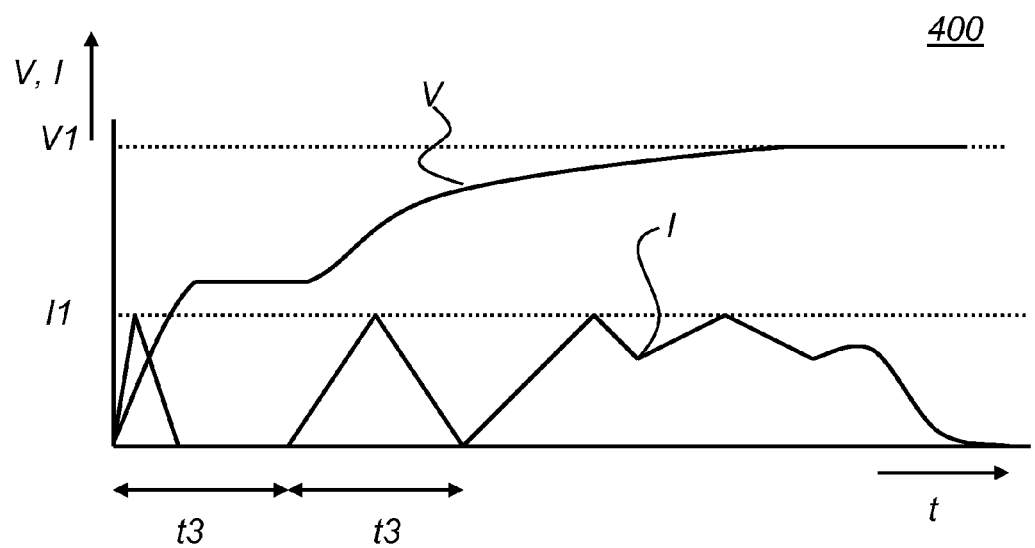
FIG. 4 shows a second graph depicting voltage and current characteristics versus time of a further embodiment of the circuit according to the invention.

Two possibly ways of operating the circuit 100 as depicted by FIG. 1 will now be first discussed in conjunction with a first graph 300 depicted by FIG. 3 and subsequently with a second graph 400 depicted by FIG. 4. Both the first graph 300 and the second graph 400 indicate time on the horizontal axis. On the vertical axis, with arbitrary values, the current through the inductor 106 and voltage between the first output terminal 126 and the second output terminal 128 are indicated.

The first graph 300 indicates the previously mentioned voltage and current characteristics over time with a first switching scheme. In the first switching scheme, the MOSFET 102 is switched on by the control circuit 150 until the current reaches a first pre-determined current value I1. The current level increases substantially linearly as the current also flows from the first input terminal to the first output terminal via the inductor 106. A person skilled in the art will appreciate that a current through an inductance cannot have a step function and in practice always increases in a continuous way. It is noted that the first graph 300 and the second graph 400 are schematic visualisations of possible circuit characteristics and are not actual characteristics, either measured or simulated.

The first pre-determined current value is in this embodiment determined by a maximum allowable current through the MOSFET 102. This maximum allowable current can be a specified continuous maximum current, a specified maximum peak current or another current level in relation to a projected MOSFET lifetime required for proper functionality of the circuit 100.

The time for the current through the current sensor 104 to reach the first pre-determined current value is measured and stored by the control circuit 105 as a first pre-determined time period t1. If the current through the current sensor 104 is detected to reach the first pre-determined current level I1, the MOSFET 102 is switched off. The MOSFET 102 is switched on again after the earlier measured and stored first pre-determined time period t1 has lapsed, which second pre-determined time period is indicated as t2 in the first graph 300. In another embodiment, the second pre-determined time period t2 is a function of the first pre-determined time period t1. The function is preferably a multiplying function, where the first pre-determined time period t1 is multiplied with a factor between 0.5 and 1.5. In particular a factor of 1 is preferred.

After the control circuit 150 determines that the second pre-determined time period t2 has lapsed, the MOSFET 102 is switched on again. Subsequently, the MOSFET 102 is switched off again as the current sensed by the current sensor 104 reaches the first pre-determined current level I1 again. During this on-state of the MOSFET 102, the first pre-determined time period t1 is measured again and the second pre-determined time period t2 is determined again. Following this on-state of the MOSFET 102, the MOSFET 102 is switched off again upon the current reaching the first pre-determined current level I1 for the second pre-determined time period t2.

This procedure is continued until the capacitance 142 of the load 140 is charged. This state can be detected in various ways. In one embodiment, the voltage over the load 140 is measured during the charging process. A person skilled in the art appreciates that while charging a capacitance through a resistive circuit by means of a DC supply voltage, the voltage over the capacitance with gradually increase towards an asymptotic value that is the same as the voltage over the DC supply. This voltage is indicated in the first graph 300 as V1.

In this embodiment, if the voltage over the load 140 is above a pre-determined threshold, the charging procedure ends. The pre-determined voltage level is preferably within a certain range of the voltage of the battery 130, for example 5% to 10% lower than the battery voltage. Upon ending of the charging procedure, the third switch 152 is switched to a conductive state to connect the battery 130 directly to the load 140.

In another embodiment, a charged state of the capacitance 142 is detected by monitoring the current through the inductor 106 and/or through the MOSFET 102. In case the current through the MOSFET 102 while the MOSFET 102 is in on state (conductive state) does not reach a certain level during a pre-determined amount of time, the capacitance 142 is at least almost fully charged. This is also indicated in the first graph 300, where the current gradually drops as the voltage over the capacitance 142 is gradually approaching an asymptotic value indicated as V1.

The second graph 400 indicates the previously mentioned voltage and current characteristics over time with a second switching scheme. In the second switching scheme, the MOSFET 102 is switched on by the control circuit 150 until the current reaches a first pre-determined current value I1. The current level increases substantially linearly as the current also flows from the first input terminal to the first output terminal via the inductor 106. A person skilled in the art will appreciate that a current through an inductance cannot have a step function and in practice always increases in a continuous way.

The pre-determined current value is in this embodiment determined by a maximum allowable current through the MOSFET 102. This maximum allowable current can be a specified continuous maximum current, a specified maximum peak current or another current level in relation to a projected MOSFET lifetime required for proper functionality of the circuit 100.

After the MOSFET 102 has been switched off, it is switched on again after a pre-determined period of time has lapsed since the previous time the MOSFET 102 has been switched on. This pre-determined amount of time is indicated with t3 at the horizontal axis of the second graph 400. This means that the period between the moment the MOSFET 102 is switched off and the moment the MOSFET 102 is switched on again is variable and depends on the rate with which the current through the MOSFET 102 reaches the pre-determined maximum level.

The second graph 400 shows that during the largest part of the first period—indicated by t3—no current flows through the inductor 106. As long as no current flows through the inductor 106, the capacitance 142 is not charged any further. This in turn means that the voltage over the capacitance 142 does not increase any further. As the capacitance 142 is further charged, the current rises less quickly and the MOSFET 102 will be switched on for a longer part of the pre-determined period of t3.

The moment that the capacitance 142 is sufficiently charged can be determined as discussed above, upon which moment the third switch 152 is switched to conductive state as well. At the moment the capacitance 142 is sufficiently charged by the battery 130 through the circuit 100, no too large currents will flow anymore from the battery 130 to the load 140 to charge the capacitance 142 as the voltage difference between both is relatively low or even negligible.

In summary, the first switching scheme has a variable frequency with a duty cycle of 50% and the second switching scheme has a fixed frequency of 1/t3 and a variable duty cycle. A person skilled in the art will appreciate that also other switching scheme are envisageable without departing from the scope of the invention.

As already indicated, the first switch 102 is preferably implemented by the MOSFET 102. A person skilled in the art will appreciate that also other solid state devices may be used, like an IGBT or other. The same or other semiconductor devices may be used for the second switch 154 and the third switch 152. Alternatively, even though less preferred, relays may be used to implement the second switch 154 and the third switch 152.

In a preferred embodiment, the battery 130 has a voltage of 360 V, the required pre-charge time is 100 ms and the capacitance 142 has a value of 1000 uF. Calculations will be provided with the following formulas:

$$I = C \cdot dV/dt \quad (1)$$

$$V = L \cdot dI/dt \quad (2)$$

Following from formula (1), the average charging current is 3.6 A. With formula (2), the value of the inductance can be determined in relation to the switching frequency. As indicated by the first graph 300 and the second graph 400, the current has a more or less triangular shape, meaning that the peak value of the current is roughly twice the average value. With formula (2), this translates to $360V = L*7.2/ton$ where ton is the time that the MOSFET 102 is switched on. If the duty cycle is 50% then $ton = 1/(2*fsw)$, where fsw is the switch frequency of the circuit. Implementing this in formula (2) leads to $L = 360/(7.2*2*fsw)$. With a suitable switching frequency of 100 to 200 kHz inductors in the range 250 uH to 125 uH will be suitable for the application. Depending on the size of the actual inductor chosen for this circuit, the inductor may be comprised by the circuit 100 as disclosed by FIG. 1 or may be provided separately, where the circuit 100 is provided without the inductor 106.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa. When data is being referred to as audiovisual data, it can represent audio only, video only or still pictures only or a combination thereof, unless specifically indicated otherwise in the description of the embodiments.

In the description above, it will be understood that when an element such as layer, region or substrate is referred to as being "on", "onto" or "connected to" another element, the element is either directly on or connected to the other element, or intervening elements may also be present.

Furthermore, the invention may also be embodied with less components than provided in the embodiments described here, wherein one component carries out multiple functions. Just as well may the invention be embodied using more elements than depicted in FIG. 1, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A charging circuit for charging a load, the charging circuit comprising:
 a) a first input terminal and a second input terminal for connecting the charging circuit to a first supply terminal and a second supply terminal, respectively, of a DC power source;
 b) a first output terminal and a second output terminal for providing an output voltage to a load to be charged;
 c) a first switch arranged between the first input terminal and the first output terminal;
 d) a current sensor arranged between the first input terminal and the first output terminal in series with the first switch;
 e) a connecting element comprising a first inductance connector and a second inductance connector for connecting an inductance, the first inductance connector connected to the first switch and the second inductance connector connected to the first output terminal; and
 f) a diode element connected to the first inductance connector and the second output terminal such that when the first switch is switched on, current flowing through the first switch is prevented from flowing from the first switch to the second output terminal via the diode element,
 wherein the first switch and the current sensor are arranged to be connected to a control circuit arranged for controlling operation of the first switch in response to a signal received from the current sensor,
 wherein the charging circuit further comprises a second switch configured to connect the first input terminal to the first output terminal such that the first switch and the connecting element are bypassed, and
 wherein the second switch is configured to be switched to a conductive state upon end of charging of the load.

2. A charging circuit according to claim 1, the charging circuit comprising the control circuit, wherein the control circuit is arranged to:
 a) upon receiving an activation signal, switch on the first switch;
 b) upon receiving a signal from the current sensor indicating that the current sensed by the current sensor is at or above a first pre-determined current level, switch off the first switch; and
 c) after a first pre-determined amount of time after the first switch has been switched off, switch on the first switch.

3. A charging circuit according to claim 2, wherein the control circuit is arranged to repeat a) through c) of claim 2 until the signal received from the current sensor indicates that the current sensed by the current sensor indicates that when the first switch is switched on, the current does not reach a second pre-determined current level within a second pre-determined amount of time.

4. A charging circuit according to claim 2, wherein the control circuit is arranged to be coupled to a voltage sensor for sensing the voltage over the load and wherein the control circuit is arranged to repeat a) through c) of claim 2 until a signal received from the voltage sensor indicates that the voltage over the load has reached a pre-determined voltage level.

5. A charging circuit according to claim 4, wherein the pre-determined voltage level is within a pre-determined range from a voltage of the DC power source.

6. A charging circuit according to claim 2, wherein the first predetermined amount of time is substantially equal to a measured amount of time that the first switch is switched on until the pre-determined current level is detected.

7. A charging circuit according to claim 2, wherein the first predetermined amount of time is substantially equal to the difference between a third pre-determined amount of time and a measured amount of time that the first switch is switched on until the pre-determined current level is detected.

8. A charging circuit according to claim 1, further comprising a third switch arranged between the second output terminal and the diode element.

9. A charging circuit according to claim 1, wherein the first switch is a solid state switch.

10. A charging circuit according to claim 9, wherein the first switch is one of the following types:
 a) IGBT
 b) MOSFET.

11. A charging circuit according to claim 1, further comprising the inductance.

12. An electrically powered vehicle comprising a charging circuit according to claim 1.

13. A method of charging a load via a circuit comprising a first output terminal and a second output terminal by providing a supply voltage via the circuit through a first input terminal and a second input terminal comprised by the circuit, the method comprising:
 a) providing the supply voltage to the load via a switch and an inductance disposed between the first input terminal and the first output terminal;
 b) sensing the current through the switch;
 c) upon the sensed current reaching a pre-determined current value, switch off the switch; and
 d) enabling electrical energy stored in the inductance to be provided to the load via a diode element disposed between the inductance and the second output terminal,
 e) connecting the first input terminal to the first output terminal upon end of charging of the load such that the switch and the inductance are bypassed.

* * * * *